Patented Feb. 7, 1950

2,496,354

UNITED STATES PATENT OFFICE 2,496,354

METHOD OF INHIBITING HYDROGEN SULFIDE CORROSION OF METALS

Melvin I. Moyer, Pawhuska, and Joseph M. Hersh, Bartlesville, Okla., assignors to Cities Service Oil Company, Bartlesville, Okla., a corporation of Delaware No Drawing. Original application September 11, 1947, Serial No. 773,505. Divided and this application September 11, 1947, Serial No. 773,506

3 Claims. (Cl. 252—8.55)

Our invention relates to an improved method of inhibiting corrosion of metal, and is more particularly concerned with the treatment of hydrogen sulfide containing brines of the type obtained in the production of crude oil to reduce their corrosive effects upon oil production and transmission equipment.

The corrosive action of oil field brines containing hydrogen sulfide in solution has long been recognized as a source of very substantial losses in oil production equipment. In some fields, for example, the brine which is taken out with the oil is so corrosive in its nature as to be capable of destroying the well tubing within a matter of a very few months; and the well casings, separators, pumps and other equipment with which such mixtures come into contact has a comparably short life. It has been the practice to utilize caustic soda, soda ash, and other alkaline compounds for neutralizing the acidic components of brines of this general character, and of thereby limiting their corrosive action. These neutralization treatments, however, require the use of comparatively large amounts of the inhibiting agents, are correspondingly costly, and from a long range point of view, have not been outstandingly successful.

The primary object of our invention is to provide an improved process for protecting metals, and particularly iron and steel equipment, used in the handling of crude oil in the presence of the highly corrosive types of brines frequently encountered in oil fields.

We have discovered that oil well tubing and casings, as well as other equipment used in oil production, may be substantially and effectively protected against corrosive action of connate brines by mixing with the latter, an organic amino-reactive compound which serves as a corrosion inhibitor. In general we have found that the heterocyclic amino-reactive compounds, the alkyl and alkanol amine-aldehyde condensation products of both cyclic and non-cyclic types, and the alkyl-ureas are effective for our purposes. It is further to be noted that melamine and hexamine, compounds selected from the first of the above groupings, have proven to be outstandingly useful as inhibitors for representative brines of varying degrees of corrosivity.

In accordance with our invention we inject a suitable quantity of a selected inhibitor compound into an oil well and thereby mingle it with the oil-brine production so that the mixture comes into contact with the well tubing, casing, and other producing equipment. Thus we may introduce the inhibitor into the top of the casing so that it flows down into the well and thence back through the tubing, pumps, collecting lines, etc. In general we have found that this procedure suffices to protect the entire system of production and collection against corrosion, to a very substantial degree; and far more effectively than treatment with caustic and other inhibiting compounds which have heretofore been used. While introduction of the inhibitor at the well head usually suffices, as has been indicated, it will be obvious that the selected compound may be added to an oil-brine mixture at any point in a system where its presence is required to limit corrosive action. It will further be noted that we prefer to introduce the inhibitor, in liquid form, as an aqueous or alcoholic solution for example, for greater convenience in handling and so that it may more readily mix with and dissolve in the brine to perform its intended function.

The effectiveness of our inhibitors may be better and more easily understood by reference to certain tests which we have conducted upon natural oil field brines containing approximately 40,000 parts per million (by weight) of natural saline solids and about 1,000 parts per million (by weight) of hydrogen sulfide, an analysis which is typical of corrosive brines produced in many fields. The test procedure involved the measurement of the corrosive action of this brine, alone and with our inhibitor compounds, upon thoroughly cleaned and polished strips of cold rolled steel measuring 4 x ½ inches x 16–18 gauge under conditions which closely approximate those existing in a producing oil well. In carrying out the tests, we filled a series of 16 ounce bottles with natural gas in order to exclude air, and to each added a calculated quantity of one of our amine reactive inhibitors, and then a measured quantity of brine to make up the inhibitor mixture, following which a test strip of known weight was completely immersed in the mixture and the bottles were sealed with rubber stoppers to insure an airtight system. Additional tests were run in other bottles in which the weighted test strips were immersed in uninhibited brine, that is, in the hydrogen sulfide containing brine just as taken from an oil well. All of the tests were run in multiple, both for the inhibited and the blank solutions, in order to avoid the anomalies of testing. At the end of a test period of about two weeks, the test strips were removed from the bottles, rinsed with water, and were then dipped in 1% hydrochloric acid solution for ten seconds to remove any light or acid washable film, following which they were successively rinsed in water, dried and weighed to determine the amount of metal lost in the corrosion treatment.

In several series of tests carried out in the manner described above it was observed that uninhibited corrosion weight loss in different brines varied from about 20 mg. to over 170 mg. per test strip while the weight loss of strips subjected to the same brines containing our inhibitors were sharply less. These test data were used to determine the protection numbers, i. e., the ratio of loss of weight of a strip subjected to an uninhibited brine to the loss of weight of a strip subjected to the same brine containing our inhibitor, which are reported below in the third column of Table I. For purposes of comparison, we then assumed a weight loss of 100 mg. for the uninhibited strip test, and corrected the actual weight losses suffered by the test strips subjected to the inhibited brines to this assumed basis, thus giving the several weight losses set forth in the fourth column of the table.

The results of these tests clearly indicate that our various inhibitors have a marked effect in reducing metal loss by the corrosive action of hydrogen sulfide containing brines. Since these tests were carried out under conditions closely approximating those existing in actual wells, they demonstrate the inhibiting effect which the agents have in protecting oil well tubing, etc. under actual producing conditions.

TABLE I

| Inhibitor | Inhibitor Concentration | Protection Number | Weight Loss, Milligrams |
|---|---|---|---|
| None | 0 | 1.0 | 100 |
| Hexamine | 62.5 | 19.0 | 5.3 |
| Melamine | 62.5 | 9.0 | 11.1 |
| D. E. A.[1]-HCHO prod | 62.5 | 7.4 | 13.5 |
| E. D. A.[2]-HCHO prod | 62.5 | 7.4 | 13.5 |
| Pyridine | 62.5 | 7.4 | 13.5 |
| M. E. A.[3]-HCHO prod | 62.5 | 6.1 | 16.4 |
| Piperidine | 62.5 | 7.1 | 14.1 |
| Diethyl thiourea | 62.5 | 5.0 | 20.0 |

[1] Reaction product of diethanolamine (2 mols) and formaldehyde (1 mol).
[2] Reaction product of ethylene diamine (1 mol) and formaldehyde (2 mols).
[3] Reaction product of monoethanolamine (1 mol) and formaldehyde (1 mol).

It will be observed that the foregoing series of tests were carried out in solutions containing 62½ parts of inhibitor compound per million parts of brine, thus giving a basis for evaluating the effectiveness of one inhibitor with respect to another. The protecting effectiveness of any of these agents may be varied, however, by increasing or decreasing the amount employed in the treating process, as is evidenced by the test results set forth in Table II. In this series of tests we employed a single inhibitor, namely, melamine, in various concentrations, in a single type of brine. Other tests on the other inhibitors indicate, also that a comparable variation in concentrations produces a comparable change in effectiveness.

TABLE II

Effect of inhibitor concentration on rate of corrosion

[14 day exposure to brine containing 1000 p. p. m. of hydrogen sulfide, followed by cleaning in 1% HCL solution for ten second period.]

| Inhibitor | Inhibitor Concentration [1] | Average Wt. Loss (Mgm.) | Protection Number [2] |
|---|---|---|---|
| None | 0 | 153 | (1.0) |
| Melamine | 5 | 120 | (1.3) |
| Do | 10 | 80 | (1.9) |
| Do | 15 | 40 | (3.8) |
| Do | 20 | 30 | (5.1) |
| Do | 30 | 25 | (6.1) |
| Do | 45 | 22 | (6.7) |
| Do | 62.5 | 20 | (7.7) |
| Do | 80 | 19 | (8.1) |

[1] Parts of inhibitor per million parts of brine (by weight)

[2] $\text{Prot. No.} = \dfrac{\text{Average loss of weight of strips subjected to uninhibited brines}}{\text{Average loss of weight of strips subjected to inhibited brines}}$ It may be noted that brines taken from different wells, even though containing about the same concentration of salt and hydrogen sulfide, may be more or less destructive in their effects upon oil handling equipment. In using our inhibitors, therefore, we find it desirable to adjust the proportion employed in accordance with the corrosive character of the brine under treatment. As a general rule, we find that from about 15 to 250 parts (by weight) of inhibitor, per million parts (by weight) of brine, is sufficient to assure highly satisfactory protection under normal operating conditions.

At the conclusion of the foregoing tests, and others which need not be specifically considered, it was observed that the metal strips exposed to the uninhibited brines were coated with a thin, flocculent, gray-to-black material. Doubtless this coating has some effect in protecting the underlying metal and slowing down corrosive action. It cannot be of any great protection value, however, because of its tendency to flake off as is evidenced by the fact that the uninhibited brines were turbid with a grayish flocculent precipitate, even though they had been standing in a quiet state for approximately two weeks. By way of contrast, the metal strips subjected to the brines containing our amino-reactive inhibitors developed thin but highly tenacious coating which appear to be particularly resistant to hydrogen sulfide brine reaction. In the case of the strips taken from the hexamine-containing solutions it was observed that the coatings were of a black, varnish-like nature, while those subjected to the melamine inhibited brines showed an almost colorless but equally adherent film. The strips taken from the other solutions likewise had resistant films comparable to those just mentioned. Some evidence of the resistant character of these films is to be found in the fact that a 10 minute treatment in 1% hydrochloric acid did not effect complete removal in many cases, and that they were not immediately affected by organic solvents such as alcohol, acetone, ether, methyl-ethyl ketone, gasoline, benzene, toluene, carbon tetrachloride, and similar solvents.

The inhibiting action of the amino-reactive compounds is not fully understood but one aspect of the action, and the successful protection of metal against substantial corrosion, certainly appears to lie in the formation of a protecting film upon the metal, as described above. These films may be complex organic products developed by the action of the inhibiting agent or its interaction with a portion of the hydrogen sulfide and brine, in the presence of metal. They certainly are not the result of mere neutralization of the hydrogen sulfide, as is evidenced by the presence of a high concentration of that ingredient in the treated brines. It may be possible, however, that the inhibitor reduces the activity of the hydrogen sulfide, and other corrosive constituents of the brine. Whatever the nature of the action may be, these facts remain clear: a film is built up on metal surfaces brought into contact with hydrogen sulfide containing brines which have been treated with amino reactive compounds in accordance with our invention; and those films are resistant both to mechanical abrasion and chemical reaction; and that the presence of the compounds in such brines does very materially inhibit corrosion of well tubing, casings, and other oil field equipment carrying the treated brines.

It will be observed that the inhibitor compounds are readily obtainable in high concentration, which permits economical shipment and handling both in transit and in the field. In this connection it will be observed that our preferred inhibitors, melamine and hexamine, are readily made or obtained as pure stable solids, which present no difficulty in the way of packaging for shipment, may be used directly in solid form by mixing them with the brine in suitable proportions, or may be made into solutions in the field to facilitate handling at the point of actual usage.

It is to be understood that our improved process is not confined to the use of only one of the inhibiting compounds referred to but the various mixtures of the inhibitors may be used in a single operation within the spirit and scope of our invention. Furthermore these corrosion reducing agents may be used alone, or with any other oil well treating compounds such as those which are conventionally employed for breaking emulsions, limiting scale formation, and the like.

This application is a division of our copending application, Serial No. 773,505 filed September 11, 1947.

Having described our invention and illustrated it by way of specific examples, what we claim as new and useful is:

1. The process of preventing corrosion of metals exposed to contact with brines containing corrosive sulfur compounds which comprises incorporating in the brine a small proportion of melamine.

2. The process of protecting metal equipment which is subject to the corrosive action of oil well brines containing hydrogen sulfide which comprises introducing into a producing oil a corrosion inhibiting agent consisting essentially of melamine.

3. The process of inhibiting the corrosion of metal equipment when exposed to corrosive brines containing hydrogen sulfide, which comprises incorporating in the brine a small proportion of melamine, the proportion of melamine being effective to substantially inhibit the corrosion of the metal equipment.

MELVIN I. MOYER.
JOSEPH M. HERSH.

REFERENCES CITED

The following references are of record in the file of this patent:

UNITED STATES PATENTS

| Number | Name | Date |
| --- | --- | --- |
| 2,197,357 | Widmer et al. | Apr. 16, 1940 |
| 2,426,318 | Menaul | Aug. 26, 1947 |

OTHER REFERENCES

"Sealing Composition for Oil and Gas Wells," Digest of Canadian Patent No. 417,444, Chemical Abstracts, vol. 38, page 1870, 1944.